(12) United States Patent
Milhas

(10) Patent No.: US 6,739,356 B2
(45) Date of Patent: May 25, 2004

(54) TUBE FOR TRANSPORTING A FLUID IN AN AUTOMOBILE

(75) Inventor: Pierre Milhas, Vitry-le-Francois (FR)

(73) Assignee: Nobel Plastiques, Marolles (FR)

( * ) Notice: Subject to any disclaimer, the term of this patent is extended or adjusted under 35 U.S.C. 154(b) by 0 days.

(21) Appl. No.: 10/385,424

(22) Filed: Mar. 12, 2003

(65) Prior Publication Data

US 2003/0192612 A1 Oct. 16, 2003

(30) Foreign Application Priority Data

Apr. 15, 2002 (FR) .............................. 02 04672

(51) Int. Cl.[7] ................................. F16L 11/00
(52) U.S. Cl. .................... 138/137; 138/141; 428/36.91
(58) Field of Search .................. 138/137, 141; 428/36.91

(56) References Cited

U.S. PATENT DOCUMENTS

| | | | | |
|---|---|---|---|---|
| 3,561,493 A | * | 2/1971 | Maillard et al. ............ | 138/141 |
| 4,842,024 A | * | 6/1989 | Palinchak .................... | 138/125 |
| 5,712,067 A | * | 1/1998 | Kawata ....................... | 430/59 |
| 5,761,595 A | * | 6/1998 | Tarnawskyj et al. ........ | 399/308 |
| 5,799,704 A | * | 9/1998 | Andre ......................... | 138/137 |
| 5,850,855 A | * | 12/1998 | Kerschbaumer et al. .... | 138/137 |
| 6,089,278 A | * | 7/2000 | Nishino et al. ............. | 138/137 |
| 6,257,281 B1 | * | 7/2001 | Nie et al. .................... | 138/137 |
| 6,491,994 B1 | * | 12/2002 | Kito et al. .................. | 428/36.5 |
| 2002/0074050 A1 | * | 6/2002 | Ikeda et al. ................. | 138/126 |

FOREIGN PATENT DOCUMENTS

| | | |
|---|---|---|
| DE | 43 15 177 | 11/1994 |
| EP | 0 754 897 | 1/1999 |
| FR | 2 766 548 | 1/1999 |

* cited by examiner

Primary Examiner—James Hook
(74) Attorney, Agent, or Firm—Young & Thompson

(57) ABSTRACT

A multilayer tube comprising at least an inner layer, an intermediate layer, and an outer layer, wherein the intermediate layer is formed by a polyphthalamide.

20 Claims, 1 Drawing Sheet

TUBE FOR TRANSPORTING A FLUID IN AN AUTOMOBILE

The present invention relates to a multilayer tube which withstands high temperatures and which has good impermeability qualities with regard to the transported fluid, and in particular motor vehicle fuel.

BACKGROUND OF THE INVENTION

In the field of plastics fuel hoses, the mechanical and chemical quality requirements of the materials employed are ever increasing. The tubes must present practically zero permeability to the components of the fuel, while having the greatest possible mechanical stability at ever higher temperatures.

Research and development in this field has led to the production of multilayer tubes by coextrusion or successive extrusions of a plurality of plastics materials, where each layer is required to satisfy one of the performance criteria laid down. The qualities of each of the layers are aggregated.

In the current state of the art, there are many examples of combinations of materials comprising three or five successive layers in which one layer displays good impermeability to fuel, another serves as mechanical reinforcement over time and at high temperature, another provides the tube with effective protection against external attack, and yet others serve as adhesives between the different layers which are not necessarily naturally compatible, given the different natures of the tube materials being used (polyamides, polyethylenes, mixtures of two materials, polyesters, elastomers, thermoplastic elastomers, PTFE, PVDF, vinyl polychloride etc . . . ).

The majority of the solutions proposed in the prior art generally do not overcome other dimensional or economic constraints in satisfactory manner. Thus certain multilayer tubes possess the necessary qualities only when of a thickness that gives the tube a weight or a size that is difficult for a manufacturer to accept. Those or other solutions proposed mean that high-grade materials have to be used, but this leads to increased cost which is an economic break on their use.

FR 2 766 548 for example describes a two-layer tube with an inner layer of a polyphthalamide and an outer layer of an elastomer or a thermoplastic. One of the disadvantages of that tube lies in the rigidity of the inner layer and this damages the qualities of the connections at the ends.

The search for solutions must therefore take account of imperatives which go beyond mere technical performance and each tube is a particular compromise directed at optimizing the differing and sometimes contradictory requirements of regulations and of the market.

OBJECT OF THE INVENTION

In this context, the invention provides a multilayer tube comprising at least an inner layer, an intermediate layer and an outer layer, the intermediate layer being made of a polyphthalamide (PPA). Polyphthalamide is a material possessing the quality of being dimensionally very stable even after a severe aging cycle. In addition sandwiching the polyphthalamide layer between two layers allows its thickness to be reduced without impairing its strength and its barrier function, thus making it possible to manufacture tubes that are flexible and easy to form.

BRIEF DESCRIPTION OF THE DRAWING

The single drawing

Figure 1:
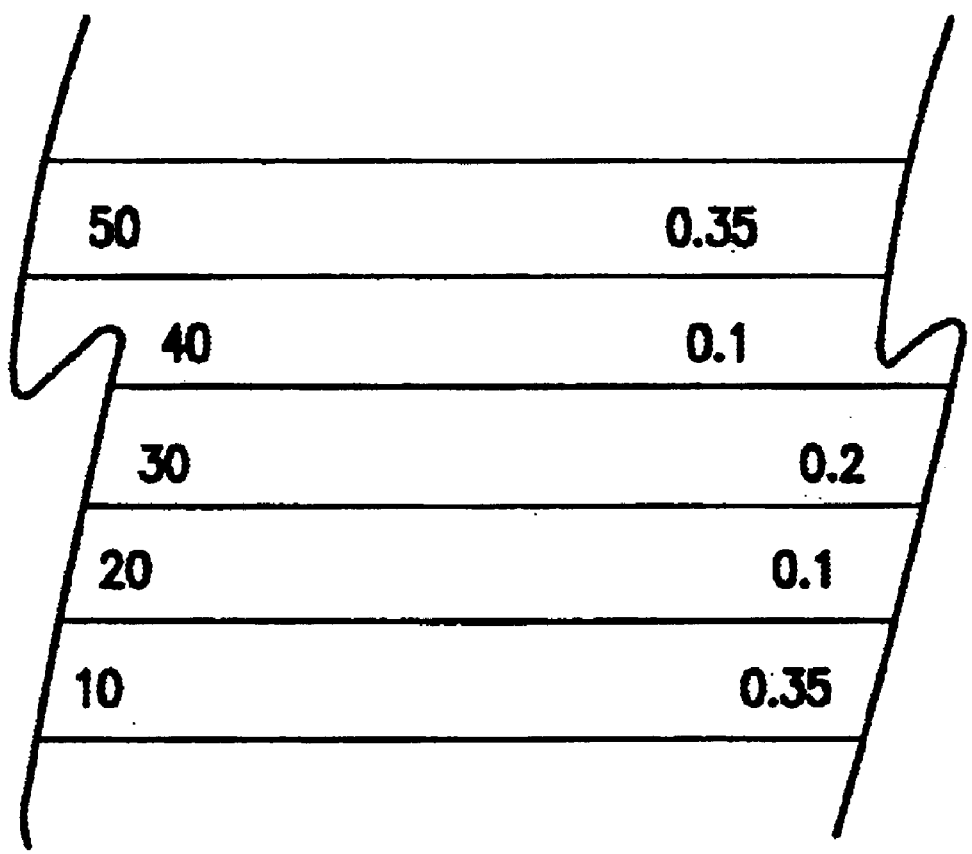
FIG. 1 illustrates a cross section of a five-layer embodiment of the present invention.

In the tube of the invention, the inner layer 10 of the tube is a material chosen from among the following materials: polyamide 6 (PA6), polyester (PBT, PBTP, PET), or a copolyester (polyester ether, polyether ether, polyether ester). Preferably the inner layer has undergone a heat stabilization treatment. It can possess a filler or it can be of a grade rendering it conductive or semi-conductive, that is to say its resistivity is less than a million ohms per centimeter.

The outer layer 50 is provided in a material selected from among thermoplastic elastomers such as thermoplastic elastomer (TPEE), an example of which is sold under the DSM's ARNITE trademark and a polyamide such as a PA12 or a PA6.36 which is resistant to zinc chloride.

In the case where the specifications require that the various layers should adhere strongly to each other, it is possible to provide an adhesive layer 20,40 both between the inner layer and the intermediate layer 30, and also between the intermediate layer and the outer layer, which adhesive layer should be capable of bonding the inner layer and the outer layer to the intermediate layer made of polyphthalamide.

For bonding between the inner layer and the intermediate layer, the adhesive can be selected from among the following materials: a polyurethane (hot melt) glue or an extrudable copolyamide glue of the type which is presently marketed under ATOFINA's PLATAMID trademark; a mixture of one of the polymers which forms either the inner layer or the intermediate layer with an extrudable polyacetate-urethane; or finally a mixture of a polymeric adhesive with the two polymers to be joined together, that is to say the polyamide or the polyester of the inner layer and the polyphthalamide of the intermediate layer.

For bonding between the intermediate layer and the outer layer, the adhesive can either be a polyurethane glue or an elastomeric mixture of polyphthalamide and thermoplastic elastomer.

Finally for the multilayer tube of the invention the thicknesses of the various layers are specified as follows:

for the inner layer 10 the thickness lies in the range 0.05 millimeters (mm) to 0.5 mm, with a preferred value of 0.35 mm;

for the intermediate layer 30 the thickness lies in the range 0.05 mm to 0.5 mm, with a preferred value of 0.2 mm;

for the outer layer 50 the thickness lies in the range 0.05 mm to 0.65 mm, with a preferred value of 0.35 mm;

for the innermost bonding layer 20 the thickness lies in the range 0.05 mm to 0.2 mm, with a preferred value of 0.1 mm;

for the outermost bonding layer 20 the thickness lies in the range 0.05 mm to 0.2 mm, with a preferred value of 0.1 mm.

FIG. 1 is not to scale, but shows an embodiment with relative thicknesses of 0.35; 0.1; 0.2; 0.1; and 0.35.

The polyphthalamide material, which is marketed for example by the supplier AMOCO, is equally well able to form a barrier to the ingredients of fuel, and with respect to the thicknesses in question, the material is twenty five times better than polyamides and fifteen times better than polyvinylidene fluorides (PVDF).

It can be noted that such a tube possesses very good impermeability which is superior to that obtainable with polymeric fluorides obtained from solutions. These are difficult to extrude and extremely costly. In addition, experiments have shown that a tube of the invention functions well at temperatures up to 160° C. if the materials used have been subjected to a heat stabilization treatment.

The tube is not only suitable for fuels, gasoline or diesel, but also for the oils used in automobiles.

Finally it should be noted that the multilayer tube can be covered with an elastomeric or thermoplastic layer to protect it against fire or to protect it from the external environment.

What is claimed is:

1. A multilayer tube comprising:

at least an inner layer;

an intermediate layer; and an outer layer, wherein the inner layer is selected from the group consisting of polyamide 6 (PA6), polyester (PBT, PBTP, PET), and copolyester (polyester ether, polyether ether, polyether ester), wherein the intermediate layer is made of a polyphthalamide, wherein the outer layer is selected from the group consisting of thermoplastic elastomer (TPEE) and polyamide (PA12, PA6.36), and wherein the intermediate layer is thinner than the outer and inner layers.

2. The multilayer tube according to claim 1, wherein the inner layer is stabilized with respect to heat.

3. The tube according to claim 1, further comprising:

a bonding layer between the inner layer and the intermediate layer, the bonding layer being selected from the group consisting of i) a polyurethane hot-melt adhesive, ii) an extrudable copolyamide adhesive, iii) a mixture of a polymer belonging to the polyamides or the polyesters or the polyphthalamides forming the layers to be bonded together, and iv) an extrudable urethane polyacetate.

4. The tube according to claim 3, wherein the thickness of the inner bonding layer is 0.1 mm.

5. The tube according to claim 1, having a bonding layer between the intermediate layer and the outer layer, the bonding layer being selected from polyurethane adhesives or a mixture of polyphthalamide or thermoplastic elastomer.

6. The tube according to claim 5, wherein the thickness of the outer bonding layer is 0.1 mm.

7. The tube according to claim 1, wherein the thicknesses of the various layers are as follows:

for the inner layer, 0.35 mm;

for the intermediate layer, 0.2 mm; and for, or the outer layer to 0.35 mm.

8. A multilayer tube comprising:

at least an inner layer;

an intermediate layer; and an outer layer, wherein the inner layer is selected from the group consisting of polyamide 6, polyester, and copolyester, wherein the intermediate layer is made of a polyphthalamide, wherein the outer layer is selected from the group consisting of thermoplastic elastomer and polyamide, and wherein the intermediate layer is thinner than the outer and inner layers.

9. The multilayer tube according to claim 8, wherein the inner layer is stabilized with respect to heat.

10. The tube according to claim 8, further comprising:

a bonding layer between the inner layer and the intermediate layer, the bonding layer being selected from the group consisting of i) a polyurethane hot-melt adhesive, ii) an extrudable copolyamide adhesive, iii) a mixture of a polymer belonging to the polyamides or the polyesters or the polyphthalamides forming the layers to be bonded together, and iv) an extrudable urethane polyacetate.

11. The tube according to claim 10, wherein the thickness of the inner bonding layer is 0.1 mm.

12. The tube according to claim 8, having a bonding layer between the intermediate layer and the outer layer, the bonding layer being selected from polyurethane adhesives or a mixture of polyphthalamide or thermoplastic elastomer.

13. The tube according to claim 12, wherein the thickness of the outer bonding layer is 0.1 mm.

14. The tube according to claim 8, wherein the thicknesses of the various layers are as follows:

for the inner layer, 0.35 mm;

for the intermediate layer, 0.2 mm; and for the outer layer to 0.35 mm.

15. A multiplayer tube, comprising:

an inner layer of a material selected from the group consisting of polyamide 6, polyester, and a copolyester;

an intermediate layer of polyphthalamide;

an inner bonding layer bonding the inner layer to the intermediate layer;

an outer layer bonding a material selected from the group consisting of thermoplastic elastomers and a polyamide; and an outer bonding layer bonding the intermediate layer to the outer layer, the intermediate layer being thinner in thickness than each of the inner and outer layers, the inner layer being of a non-elastomeric material.

16. The tube of claim 15, wherein the inner layer is one of polyester ether, polyether ether, and polyether ester.

17. The tube of claim 15, wherein the inner and outer bonding layers comprise an adhesive selected from the group consisting of i) a mixture of one of the polymers forming either the inner layer or the intermediate layer with an extrudable poly-acetate-urethane, and ii) a mixture of a polymeric adhesive with the polymer of the inner layer and the polyphthalamide of the intermediate layer.

18. The tube of claim 15, wherein the outer bonding layer comprises one of a polyurethane glue, an elastomeric mixture of polyphthalamide, and a thermoplastic elastomer.

19. The tube of claim 15, wherein, a thickness of the inner layer lies in the range 0.05 millimeters (mm) to 0.5 mm;

a thickness of the intermediate layer lies in the range 0.05 mm to 0.5 mm; and a thickness of the outer layer lies in the range 0.05 mm to 0.65 mm.

20. The tube of claim 15, wherein, a thickness of the inner layer is 0.35 mm;

a thickness of the intermediate layer is 0.2 mm;

a thickness of the outer layer is 0.35 mm.

a thickness of the inner bonding layer is 0.1 mm; and a thickness of the outer bonding layer is 0.1 mm.

* * * * *